US012591381B2

(12) United States Patent
Tseng et al.

(10) Patent No.: US 12,591,381 B2
(45) Date of Patent: Mar. 31, 2026

(54) METHOD FOR ADJUSTING OPERATION MODE, MEMORY STORAGE DEVICE AND MEMORY CONTROL CIRCUIT UNIT

(71) Applicant: PHISON ELECTRONICS CORP., Miaoli (TW)

(72) Inventors: Yen Chun Tseng, Tainan City (TW); Shih Hwa Liu, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 23 days.

(21) Appl. No.: 18/516,891

(22) Filed: Nov. 21, 2023

(65) Prior Publication Data

US 2025/0103222 A1 Mar. 27, 2025

(30) Foreign Application Priority Data

Sep. 27, 2023 (TW) ................................. 112136934

(51) Int. Cl.
*G06F 3/06* (2006.01)

(52) U.S. Cl.
CPC .......... *G06F 3/0625* (2013.01); *G06F 3/0634* (2013.01); *G06F 3/0659* (2013.01); *G06F 3/0679* (2013.01)

(58) Field of Classification Search
CPC .... G06F 3/0625; G06F 3/0634; G06F 3/0659; G06F 3/0679; G06F 3/0619; G06F 3/064; G06F 3/065; G06F 3/067; G06F 12/02
See application file for complete search history.

(56) References Cited

U.S. PATENT DOCUMENTS

| | | | | |
|---|---|---|---|---|
| 2012/0089766 A1* | 4/2012 | Yu | ........................... | G06F 12/00 |
| | | | | 365/189.16 |
| 2017/0060426 A1* | 3/2017 | Lee | ...................... | G06F 3/0688 |
| 2019/0129636 A1* | 5/2019 | Benisty | ................. | G06F 3/0634 |
| 2022/0283740 A1* | 9/2022 | Yeh | ........................... | G06F 3/061 |
| 2023/0041215 A1* | 2/2023 | Porzio | ................... | G06F 3/0625 |
| 2023/0195343 A1* | 6/2023 | Lim | ...................... | G06F 3/0604 |
| | | | | 711/170 |
| 2023/0350585 A1* | 11/2023 | Zhao | ...................... | G06F 3/0659 |
| 2024/0289017 A1* | 8/2024 | Wang | ...................... | G06F 3/061 |
| 2025/0004652 A1* | 1/2025 | Tsien | ................... | G06F 3/0673 |

FOREIGN PATENT DOCUMENTS

TW        I451435        9/2014

OTHER PUBLICATIONS

"Office Action of Taiwan Counterpart Application", issued on Jul. 10, 2024, p. 1-p. 5.

* cited by examiner

*Primary Examiner* — Tracy C Chan
(74) *Attorney, Agent, or Firm* — JCIPRNET

(57) ABSTRACT

A memory control method, a memory storage device and a memory control circuit unit are disclosed. The method includes: detecting a state of the memory storage device; and adjusting an operation mode of the memory storage device according to the state of the memory storage device, wherein the operation mode includes a first operation mode and a second operation mode, and a first waiting time before the memory storage device entering a power saving mode in the first operation mode is longer than a second waiting time before the memory storage device entering the power saving mode in the second operation mode.

18 Claims, 8 Drawing Sheets

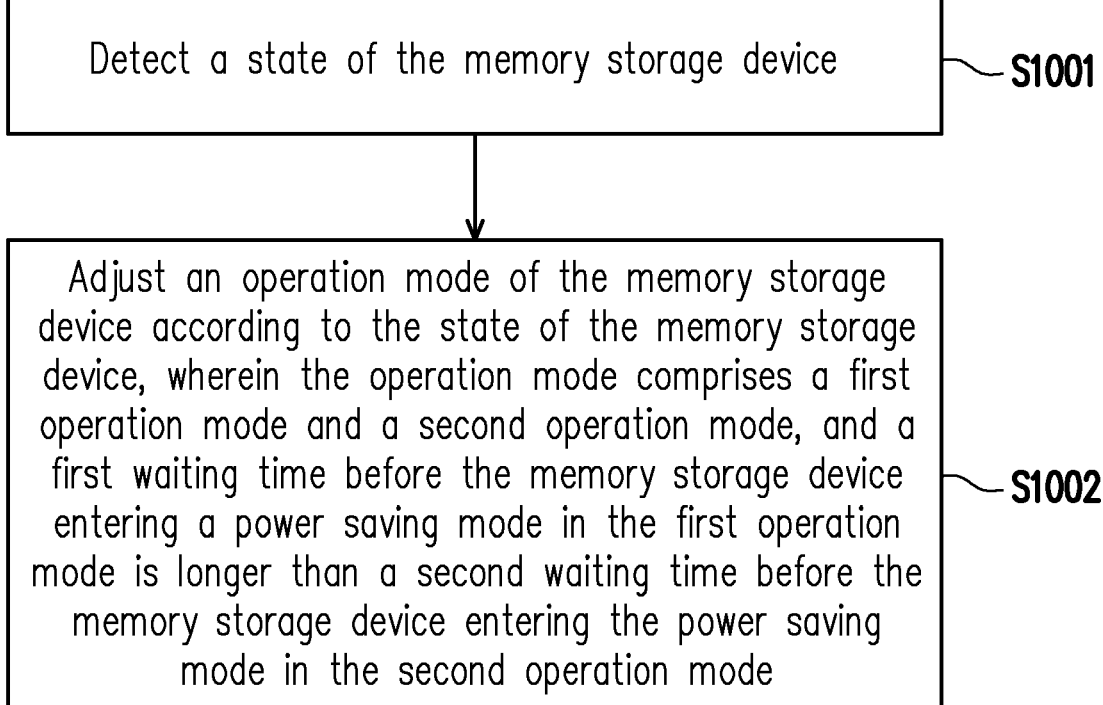

Detect a state of the memory storage device ~S1001

Adjust an operation mode of the memory storage device according to the state of the memory storage device, wherein the operation mode comprises a first operation mode and a second operation mode, and a first waiting time before the memory storage device entering a power saving mode in the first operation mode is longer than a second waiting time before the memory storage device entering the power saving mode in the second operation mode ~S1002

FIG. 10

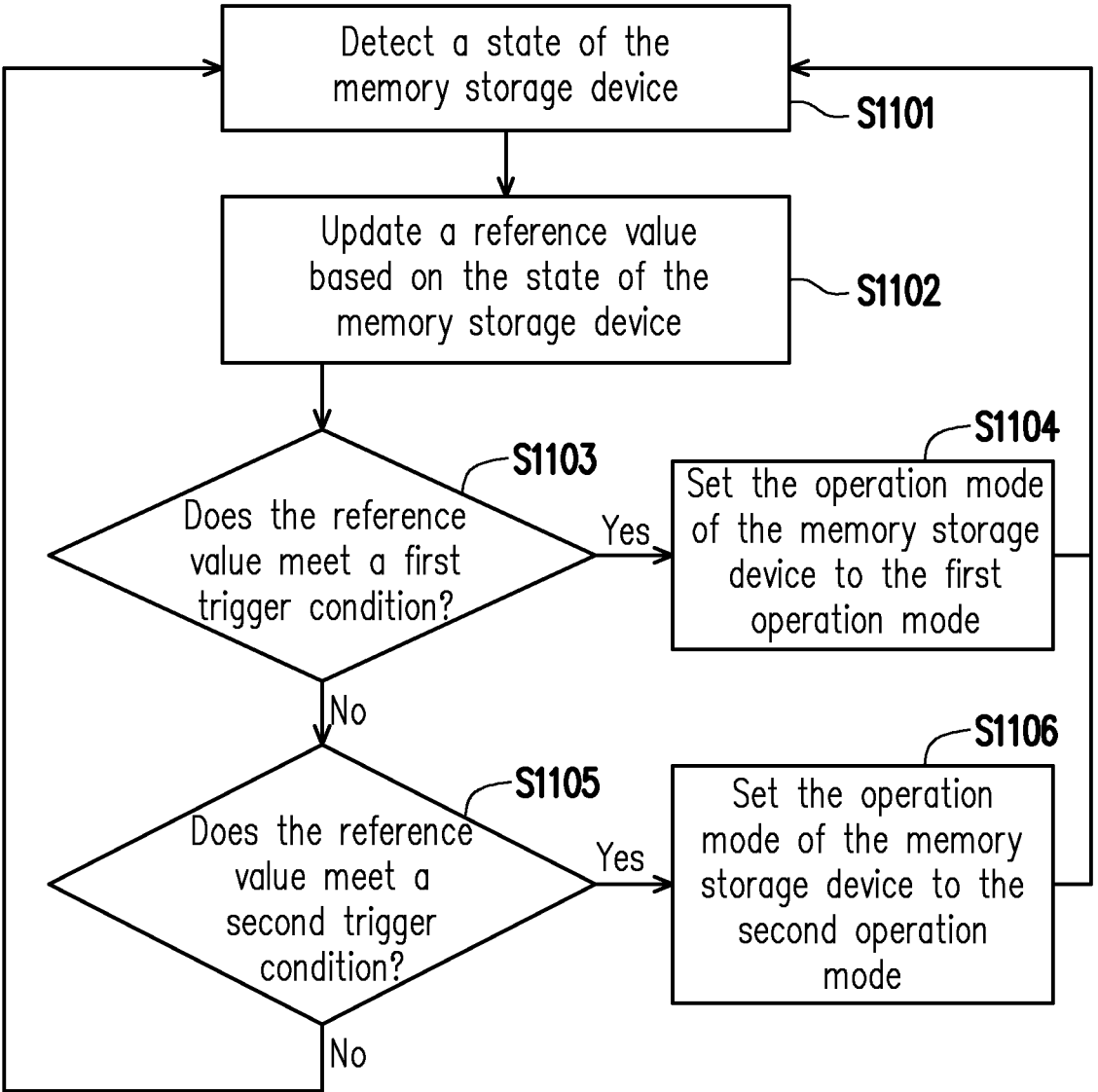

Detect a state of the memory storage device — S1101

Update a reference value based on the state of the memory storage device — S1102

S1103
Does the reference value meet a first trigger condition?

Yes → S1104
Set the operation mode of the memory storage device to the first operation mode No ↓

S1105
Does the reference value meet a second trigger condition?

Yes → S1106
Set the operation mode of the memory storage device to the second operation mode No

FIG. 11

METHOD FOR ADJUSTING OPERATION MODE, MEMORY STORAGE DEVICE AND MEMORY CONTROL CIRCUIT UNIT

CROSS-REFERENCE TO RELATED APPLICATION

This application claims the priority benefit of Taiwan application serial no. 112136934, filed on Sep. 27, 2023. The entirety of the above-mentioned patent application is hereby incorporated by reference herein and made a part of this specification.

BACKGROUND

Technical Field

The invention relates to a memory control technology, and particularly relates to a memory control method, a memory storage device and a memory control circuit unit.

Description of Related Art

Portable electronic devices such as mobile phones and notebook computers have grown rapidly in recent years, resulting in a rapid increase in consumer's demand for storage media. Since a rewriteable non-volatile memory module (such as a flash memory) has characteristics of non-volatile data, power saving, small size, and no mechanical structure, it is very suitable to be built in various portable electronic devices as mentioned above.

Some types of memory storage devices may automatically enter a power saving mode after being idle for more than a preset time length. In this way, power consumption of the memory storage device in an idle state may be reduced. Generally, before the memory storage device leaves a manufacturing factory, the preset time length may be set to an optimal value, so as to achieve a balance between performance and power consumption of the memory storage device after the memory storage device leaves the manufacturing factory. However, in practice, no matter how this preset time length is optimized before the memory storage device leaves the manufacturing factory, once a working state of the memory storage device changes, the balance between the performance and power consumption of the memory storage device may be easily broken (for example, the performance of the memory storage device is significantly reduced or the power consumption of the memory storage device is significantly increased), thus affecting a user experience.

SUMMARY

The invention is directed to a memory control method, a memory storage device and a memory control circuit unit, which are capable of mitigating the above-mentioned problem.

An exemplary embodiment of the invention provides a memory control method adapted to a memory storage device. The memory control method includes: detecting a state of the memory storage device; and adjusting an operation mode of the memory storage device according to the state of the memory storage device, wherein the operation mode includes a first operation mode and a second operation mode, and a first waiting time before the memory storage device entering a power saving mode in the first operation mode is longer than a second waiting time before the memory storage device entering the power saving mode in the second operation mode.

An exemplary embodiment of the invention further provides a memory storage device, which includes a connection interface unit, a rewritable non-volatile memory module and a memory control circuit unit. The connection interface unit is coupled to a host system. The memory control circuit unit is coupled to the connection interface unit and the rewritable non-volatile memory module. The memory control circuit unit is configured to: detecting a state of the memory storage device; and adjusting an operation mode of the memory storage device according to the state of the memory storage device, wherein the operation mode includes a first operation mode and a second operation mode, and a first waiting time before the memory storage device entering a power saving mode in the first operation mode is longer than a second waiting time before the memory storage device entering the power saving mode in the second operation mode.

An exemplary embodiment of the invention further provides a memory control circuit unit configured to control a rewritable non-volatile memory module. The memory control circuit unit includes a host interface, a memory interface and a memory management circuit. The host interface is coupled to a host system. The memory interface is coupled to the rewritable non-volatile memory module. The memory management circuit is coupled to the host interface and the memory interface. The memory management circuit is configured to: detecting a state of the memory storage device; and adjusting an operation mode of the memory storage device according to the state of the memory storage device, wherein the operation mode includes a first operation mode and a second operation mode, and a first waiting time before the memory storage device entering a power saving mode in the first operation mode is longer than a second waiting time before the memory storage device entering the power saving mode in the second operation mode.

Based on the above description, by dynamically deciding to operate the memory storage device in the first operation mode or the second operation mode, the waiting time before the memory storage device enters the power saving mode may be dynamically adjusted. In this way, the power consumption of the memory storage device may be further reduced without affecting the performance of the memory storage device as much as possible.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 10 is a flowchart of a memory control method according to an exemplary embodiment of the invention.

FIG. 11 is a flowchart of a memory control method according to an exemplary embodiment of the invention.

DESCRIPTION OF THE EMBODIMENTS

Generally, a memory storage device (also known as a memory storage system) includes a rewritable non-volatile memory module and a controller (also known as a control circuit). The memory storage device may be used together with a host system such that the host system may write data into the memory storage device or read data from the memory storage device.

Figure 1:
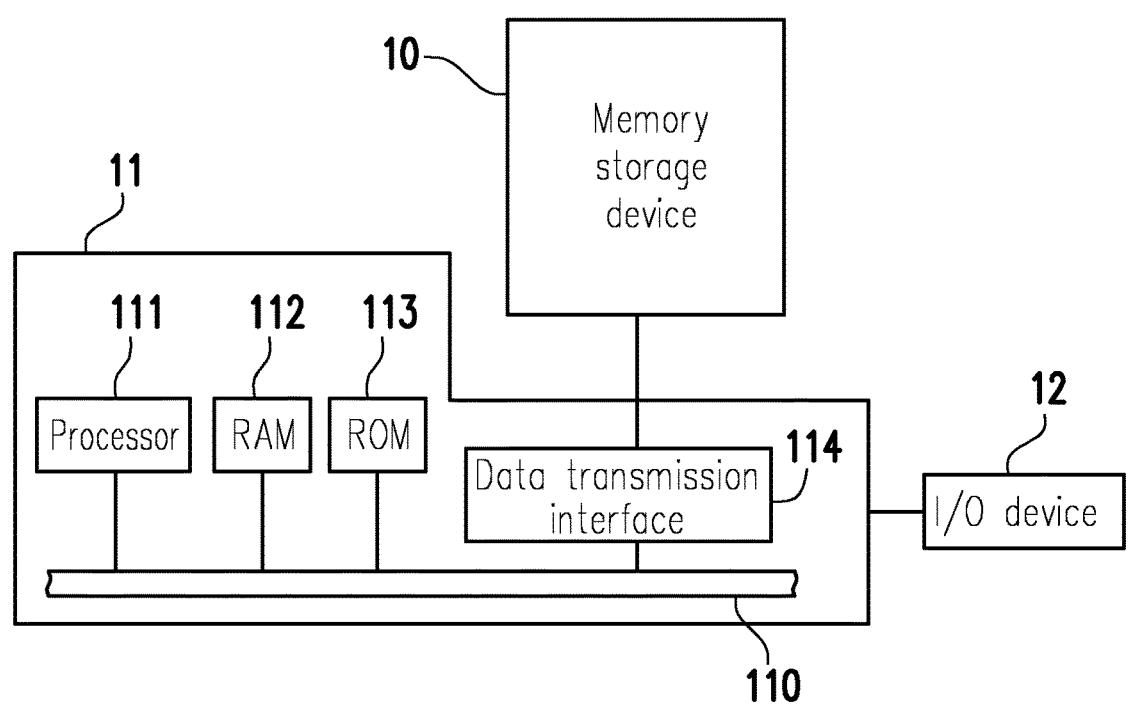
FIG. 1 is a schematic diagram of a host system, a memory storage device, and an input/output (I/O) device according to an exemplary embodiment of the invention.
Figure 2:
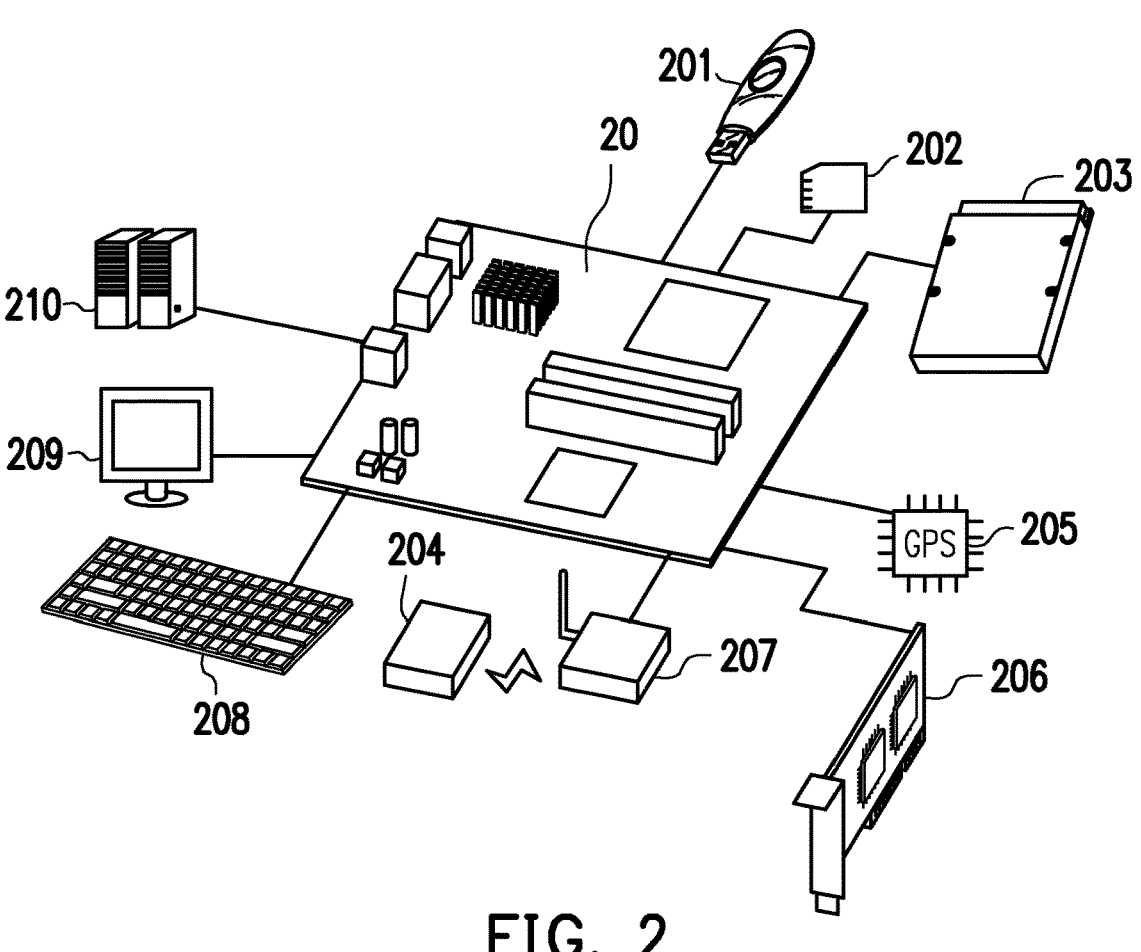
FIG. 2 is a schematic diagram of a host system, a memory storage device, and an I/O device according to an exemplary embodiment of the invention.

FIG. 1 is a schematic diagram of a host system, a memory storage device, and an input/output (I/O) device according to an exemplary embodiment of the invention. FIG. 2 is a schematic diagram of a host system, a memory storage device, and an I/O device according to an exemplary embodiment of the invention.

Referring to FIG. 1 and FIG. 2, the host system 11 may include a processor 111, a random access memory (RAM) 112, a read only memory (ROM) 113 and a data transmission interface. 114. The processor 111, the RAM 112, the ROM 113 and the data transmission interface 114 may be coupled to a system bus 110.

In an example embodiment, the host system 11 may be coupled to the memory storage device 10 through the data transmission interface 114. For example, the host system 11 may store data to or read data from the memory storage device 10 through the data transmission interface 114. In addition, the host system 11 may be coupled to an I/O device 12 through the system bus 110. For example, the host system 11 may transmit output signals to the I/O device 12 or receive input signals from the I/O device 12 via the system bus 110.

In an example embodiment, the processor 111, the RAM 112, the ROM 113 and the data transmission interface 114 may be disposed on a motherboard 20 of the host system 11. The number of data transmission interfaces 114 may be one or plural. Through the data transmission interface 114, the motherboard 20 may be coupled to the memory storage device 10 through a wired or wireless manner.

In an exemplary embodiment, the memory storage device 10 may be, for example, a pen drive 201, a memory card 202, a solid state drive (SSD) 203 or a wireless memory storage device 204. The wireless memory storage device 204 may be, for example, a near field communication (NFC) memory storage device, a wireless fidelity (WiFi) memory storage device, a Bluetooth memory storage device or a Bluetooth low energy memory storage device (such as iBeacon) and other memory storage devices based on various wireless communication technologies. Moreover, the motherboard 20 may also be coupled to various I/O devices such as a global positioning system (GPS) module 205, a network interface card 206, a wireless transmission device 207, a keyboard 208, a screen 209, a speaker 210, etc., through the system bus 110. For example, in an exemplary embodiment, the motherboard 20 may access the wireless memory storage device 204 through the wireless transmission device 207.

In an exemplary embodiment, the host system 11 is a computer system. In an example embodiment, the host system 11 may be any system that may substantially cooperate with a memory storage device to store data. In an example embodiment, the memory storage device 10 and the host system 11 may respectively include a memory storage device 30 and a host system 31 of FIG. 3.

Figure 3:
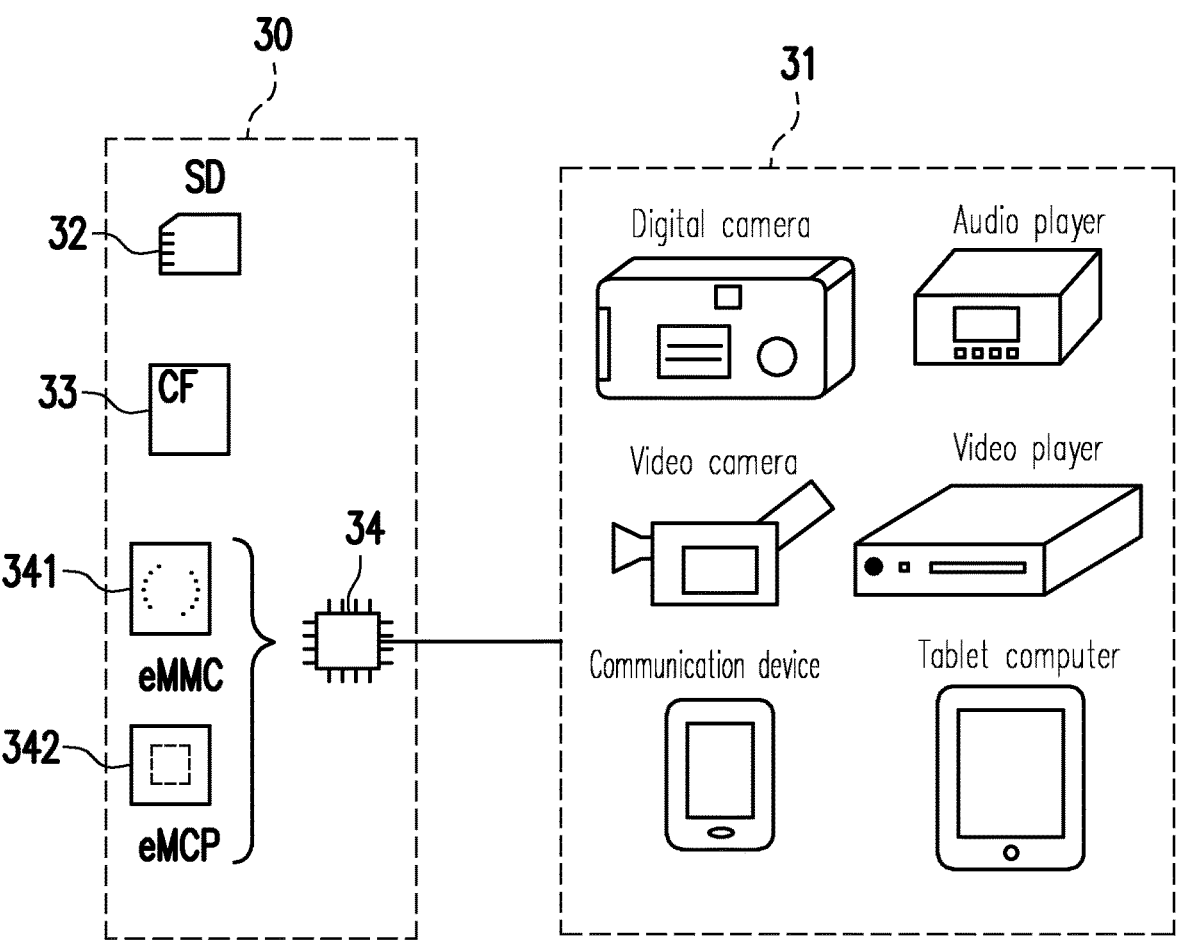
FIG. 3 is a schematic diagram of a host system and a memory storage device according to an exemplary embodiment of the invention.

FIG. 3 is a schematic diagram of a host system and a memory storage device according to an exemplary embodiment of the invention. Referring to FIG. 3, the memory storage device 30 may be used in collaboration with the host system 31 to store data. For example, the host system 31 may be a digital camera, a video camera, a communication device, an audio player, a video player or a tablet computer, etc. For example, the memory storage device 30 may be various non-volatile memories such as a secure digital (SD) card 32, a compact flash (CF) card 33 or an embedded storage device 34, etc., used by the host system 31. The embedded storage device 34 includes various types of embedded storage devices, such as an embedded multi media card (eMMC) 341 and/or an embedded multi chip package (eMCP) storage device 342, that directly couple memory modules to a substrate of the host system.

Figure 4:
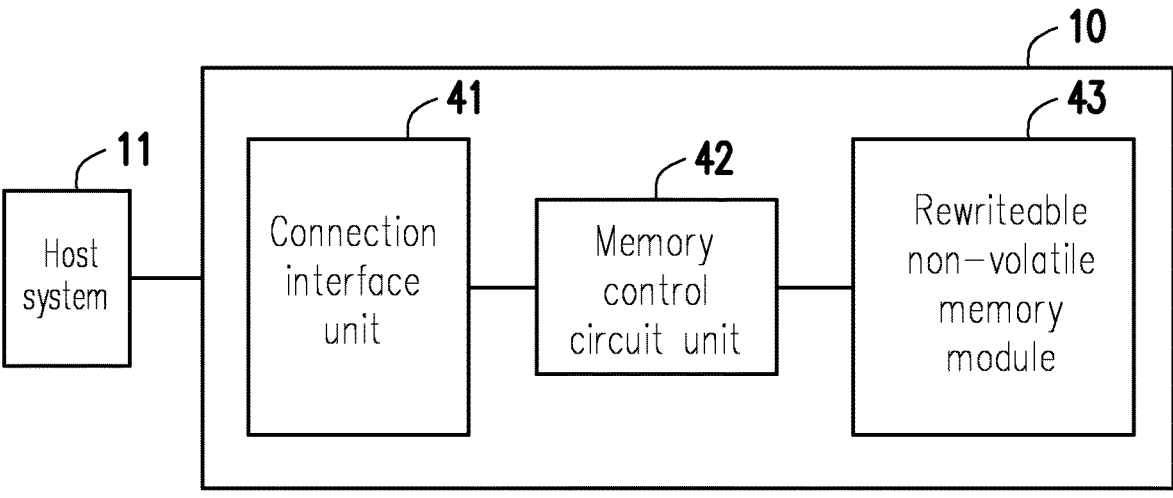
FIG. 4 is a schematic diagram of a memory storage device according to an exemplary embodiment of the invention.

FIG. 4 is a schematic diagram of a memory storage device according to an exemplary embodiment of the invention. Referring to FIG. 4, the memory storage device 10 includes a connection interface unit 41, a memory control circuit unit 42 and a rewritable non-volatile memory module 43.

The connection interface unit 41 is configured to couple the memory storage device 10 to the host system 11. The memory storage device 10 may communicate with the host system 11 via the connection interface unit 41. In an exemplary embodiment, the connection interface unit 41 is compatible with a peripheral component interconnect express (PCI Express) standard. In an exemplary embodiment, the connection interface unit 41 may also be compatible with a serial advanced technology attachment (SATA) standard, a parallel advanced technology attachment (PATA) standard, an institute of electrical and electronic engineers (IEEE) 1394 standard, a universal serial bus (USB) standard, an SD interface standard, an ultra high speed-I (UHS-I) interface standard, an ultra high speed-II (UHS-II) interface standard, a memory stick (MS) interface standard, an MCP interface standard, an MMC interface standard, an eMMC interface standard, a universal flash storage (UFS) interface standard, an eMCP interface standard, a CF interface standard, an integrated device electronics (IDE) standard or other suitable standards. The connection interface unit 41 and the memory control circuit unit 42 may be packaged in one chip, or the connection interface unit 41 may be arranged outside a chip including the memory control circuit unit 42.

The memory control circuit unit 42 is coupled to the connection interface unit 41 and the rewritable non-volatile memory module 43. The memory control circuit unit 42 is configured to execute a plurality of logic gates or control instructions implemented in a hardware mode or a firmware mode and performs writing, reading and erasing operations on data in the rewritable non-volatile memory module 43 according to instructions of the host system 11.

The rewritable non-volatile memory module 43 is configured to store data written by the host system 11. The rewritable non-volatile memory module 43 may include a single level cell (SLC) NAND flash memory module (i.e., a flash memory module that may store 1 bit in one memory cell), a multi level cell (MLC) NAND flash memory module (i.e., a flash memory module that may store 2 bits in one memory cell), a triple level cell (TLC) NAND flash memory module (i.e., a flash memory module that may store 3 bits in one memory cell), a quad level cell (QLC) NAND flash memory module (i.e., a flash memory module that may store 4 bits in one memory cell), other flash memory modules, or other memory modules with the same characteristics.

Each memory cell in the rewritable non-volatile memory module 43 stores one or more bits based on a change in voltage (which is also referred to as a threshold voltage hereinafter). Specifically, there is a charge trapping layer between a control gate and a channel of each memory cell. By applying a writing voltage to the control gate, an amount of electrons in the charge trapping layer may be changed, thereby changing the threshold voltage of the memory cell. The operation of changing the threshold voltage of the memory cell is also referred to as "writing data into the memory cell" or "programming the memory cell." As the threshold voltage changes, each memory cell in the rewritable non-volatile memory module 43 has multiple storage states. By applying a reading voltage, it is able to determine which storage state a memory cell belongs to, thereby obtaining one or more bits stored in the memory cell.

In an exemplary embodiment, the memory cells of the rewritable non-volatile memory module 43 may constitute multiple physical programming units, and these physical programming units may constitute multiple physical erasing units. Specifically, memory cells on a same word line may constitute one or more physical programming units. If each memory cell may store two or more 2 bits, the physical programming units on the same word line may be at least classified into lower physical programming units and upper physical programming units. For example, the least significant bit (LSB) of a memory cell belongs to the lower physical programming unit, and the most significant bit (MSB) of a memory cell belongs to the upper physical programming unit. Generally, in an MLC NAND flash memory, a writing speed of the lower physical programming units may be greater than a writing speed of the upper physical programming units, and/or reliability of the lower physical programming units is higher than that of the upper physical programming units.

In an example embodiment, physical programming unit is the smallest unit for programming. Namely, physical programming unit is the smallest unit for writing data. For example, physical programming unit may be a physical page or a physical sector. If the physical programming unit is a physical page, these physical programming units may include a data bit area and a redundancy bit area. The data bit area contains a plurality of physical sectors to store user data, while the redundancy bit area is configured to store system data (for example, management data such as error correcting codes). In an example embodiment, the data bit area includes 32 physical sectors, and a size of one physical sector is 512 bytes (B). However, in other example embodiments, the data bit area may also include 8, 16, or more or less physical sectors, and the size of each physical sector may also be larger or smaller. On the other hand, physical erasing unit is the smallest unit for erasing data. Namely, each physical erasing unit contains the minimum number of memory cells that are erased together. For example, the physical erasing unit is a physical block.

Figure 5:
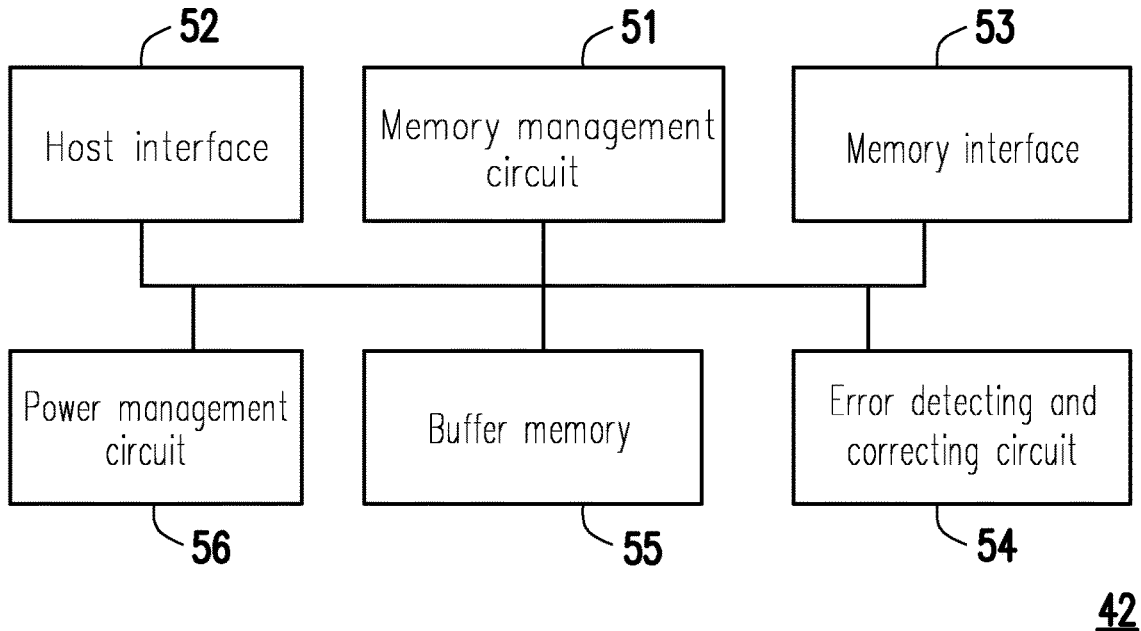
FIG. 5 is a schematic diagram of a memory control circuit unit according to an exemplary embodiment of the invention.

FIG. 5 is a schematic diagram of a memory control circuit unit according to an exemplary embodiment of the invention. Referring to FIG. 5, the memory control circuit unit 42 includes a memory management circuit 51, a host interface 52 and a memory interface 53.

The memory management circuit 51 is configured to control an overall operation of the memory control circuit unit 42. Specifically, the memory management circuit 51 has a plurality of control instructions, and when the memory storage device 10 operates, these control instructions may be executed to perform data writing, reading, and erasing operations. When the operation of the memory management circuit 51 is described below, it is equivalent to describing the operation of the memory control circuit unit 42.

In an exemplary embodiment, the control instructions of the memory management circuit 51 are implemented in a form of firmware. For example, the memory management circuit 51 has a microprocessor unit (not shown) and a read-only memory (not shown), and these control instructions are burned into the read-only memory. When the memory storage device 10 operates, these control instructions may be executed by the microprocessor unit to perform data writing, reading, erasing and other operations.

In an exemplary embodiment, the control instructions of the memory management circuit 51 may also be stored in a specific area of the rewritable non-volatile memory module 43 (for example, a system area dedicated to store system data in the memory module) in a form of program code. In addition, the memory management circuit 51 has a microprocessor unit (not shown), a read-only memory (not shown) and a random access memory (not shown). In particular, the read-only memory has a boot code, and when the memory control circuit unit 42 is enabled, the microprocessor unit may first execute the boot code to load the control instructions stored in the rewritable non-volatile memory module 43 into the random access memory of the memory management circuit 51. Thereafter, the microprocessor unit may run these control instructions to perform data writing, reading and erasing operations.

In an exemplary embodiment, the control instructions of the memory management circuit 51 may also be implemented in a form of hardware. For example, the memory management circuit 51 includes a microcontroller, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microcontroller. The memory cell management circuit is configured to manage memory cells or memory cell groups of the rewritable non-volatile memory module 43. The memory writing circuit is configured to issue a writing instruction sequence to the rewritable non-volatile memory module 43 to write data into the rewritable non-volatile memory module 43. The memory reading circuit is configured to issue a reading instruction sequence to the rewritable non-volatile memory module 43 to read data from the rewritable non-volatile memory module 43. The memory erasing circuit is configured to issue an erasing instruction sequence to the rewritable non-volatile memory module 43 to erase data from the rewritable non-volatile memory module 43. The data processing circuit is configured to process data to be written to the rewritable non-volatile memory module 43 and data to be read from the rewritable non-volatile memory module 43. The writing instruction sequence, the reading instruction sequence and the erasing instruction sequence may respectively include one or a plurality of program codes or instruction codes and are configured to instruct the rewritable non-volatile memory module 43 to perform corresponding writing, reading and erasing operations. In an exemplary embodiment, the memory management circuit 51 may also issue other types of instruction sequences to the rewritable non-volatile memory module 43 to instruct execution of corresponding operations.

The host interface 52 is coupled to the memory management circuit 51. The memory management circuit 51 may communicate with the host system 11 through the host interface 52. The host interface 52 may be configured to receive and identify instructions and data transmitted by the host system 11. For example, instructions and data sent by the host system 11 may be sent to the memory management circuit 51 through the host interface 52. In addition, the memory management circuit 51 may transmit data to the host system 11 through the host interface 52. In the exemplary embodiment, the host interface 52 is compliant with a PCI Express standard. However, it must be understood that the invention is not limited thereto. The host interface 52 may also be compatible with a SATA standard, a PATA standard, an IEEE 1394 standard, a USB standard, an SD standard, a UHS-I standard, a UHS-II standard, an MS standard, an MMC standard, an eMMC standard, a UFS standard, a CF standard, an IDE standard or other suitable data transmission standards.

The memory interface 53 is coupled to the memory management circuit 51 and configured to access the rewritable non-volatile memory module 43. For example, the memory management circuit 51 may access the rewritable non-volatile memory module 43 through the memory interface 53. Namely, the data to be written to the rewritable non-volatile memory module 43 may be converted into a format acceptable to the rewritable non-volatile memory module 43 through the memory interface 53. Specifically, if the memory management circuit 51 wants to access the rewritable non-volatile memory module 43, the memory interface 53 may send a corresponding instruction sequence. For example, these instruction sequences may include a writing instruction sequence instructing to write data, a reading instruction sequence instructing to read data, an erasing instruction sequence instructing to erase data, and corresponding instruction sequences instructing various memory operations (for example, operations of changing a reading voltage level or performing garbage collection (GC), etc.). These instruction sequences are generated, for example, by the memory management circuit 51 and transmitted to the rewritable non-volatile memory module 43 through the memory interface 53. These instruction sequences may include one or a plurality of signals or data on the bus. These signals or data may include instruction codes or program codes. For example, the reading instruction sequence may include information such as a reading identification code, a memory address, etc.

In an exemplary embodiment, the memory control circuit unit 42 further includes an error detecting and correcting circuit 54, a buffer memory 55 and a power management circuit 56.

The error detecting and correcting circuit 54 is coupled to the memory management circuit 51 and is used to perform an error detecting and correcting operation to ensure correctness of data. Specifically, when the memory management circuit 51 obtains a writing instruction from the host system 11, the error detecting and correcting circuit 54 generates a corresponding error correcting code (ECC) and/or error detecting code (EDC) for the data corresponding to the writing instruction, and the memory management circuit 51 may write the data corresponding to the writing instruction and the corresponding error correcting code and/or error detecting code into the rewritable non-volatile memory module 43. Thereafter, when the memory management circuit 51 reads data from the rewritable non-volatile memory module 43, it may also read the error correcting code and/or error detecting code corresponding to the data at the same time, and the error detecting and correcting circuit 54 may perform an error detecting and correcting operation on the read data based on the error correcting code and/or error detecting code.

The buffer memory 55 is coupled to the memory management circuit 51 and configured to temporarily store data. The power management circuit 56 is coupled to the memory management circuit 51 and configured to control a power supply of the memory storage device 10.

In an example embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
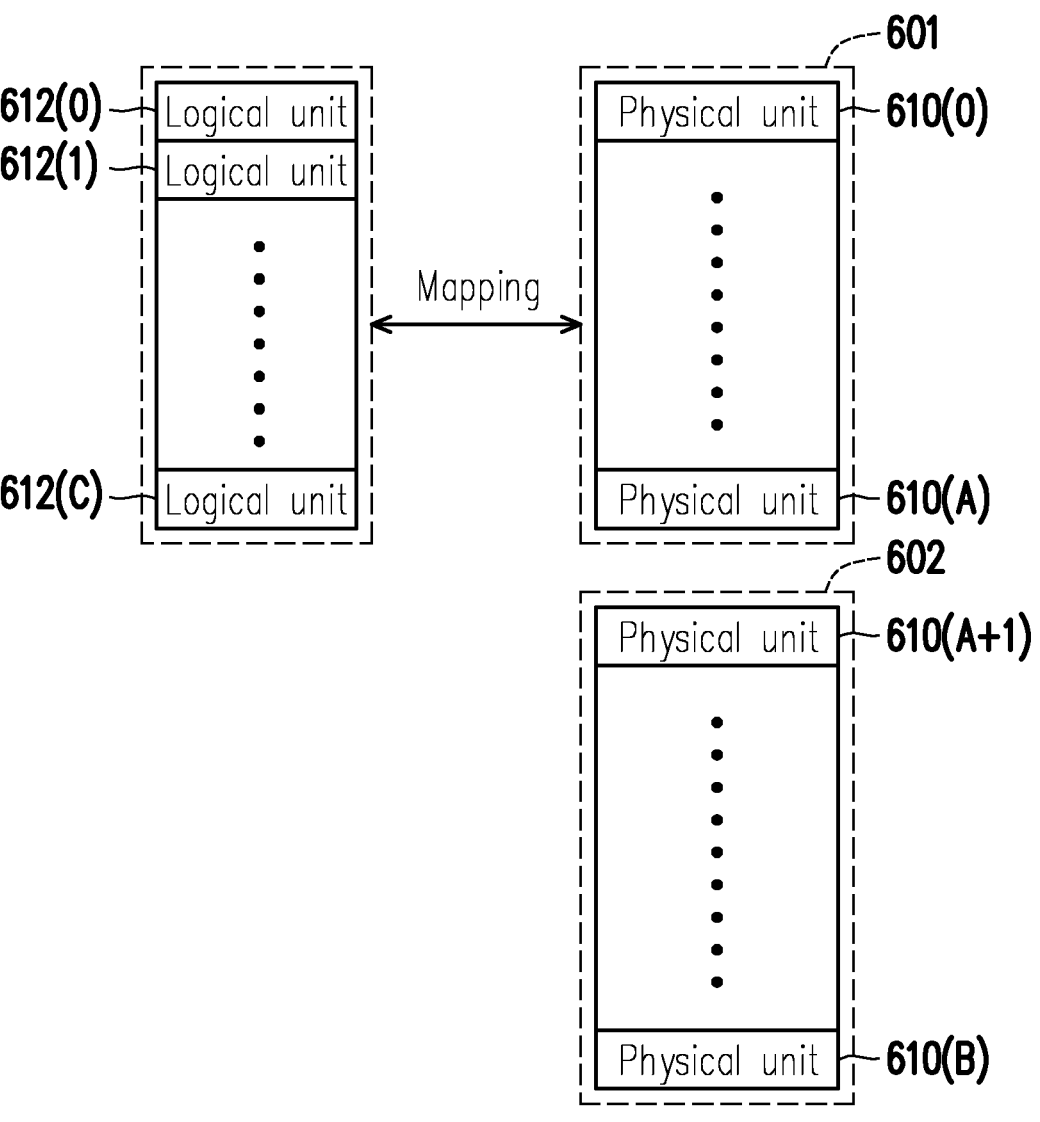
FIG. 6 is a schematic diagram of managing a rewritable non-volatile memory module according to an exemplary embodiment of the invention.

FIG. 6 is a schematic diagram of managing a rewritable non-volatile memory module according to an exemplary embodiment of the invention. Referring to FIG. 6, the memory management circuit 51 may logically group a plurality of physical units 610(0)-610(B) in the rewritable non-volatile memory module 43 into a storage area 601 and a spare area 602.

In an example embodiment, one physical unit refers to one physical address or one physical programming unit. In an example embodiment, one physical unit may also be composed of a plurality of continuous or discontinuous physical addresses. In an example embodiment, one physical unit may also refer to one virtual block (VB). One virtual block may include a plurality of physical addresses or a plurality of physical programming units. In an example embodiment, one virtual block may also include one or a plurality of physical erasing units.

The physical units 610(0)-610(A) in the storage area 601 are configured to store user data (for example, user data from the host system 11 in FIG. 1). For example, the physical units 610(0)-610(A) in the storage area 601 may store valid data and invalid data. The physical units 610(A+1)-610(B) in the spare area 602 do not store data (for example, valid data). For example, if a certain physical unit does not store valid data, this physical unit may be associated (or added) to the spare area 602. In addition, the physical units in the spare area 602 (or the physical units that do not store valid data) may be erased. As new data is written, one or a plurality of physical units may be retrieved from spare area 602 to store the new data. In an exemplary embodiment, the spare area 602 is also referred to as a free pool.

The memory management circuit 51 may configure logical units 612(0)-612(C) to map the physical units 610(0)-610(A) in the storage area 601. In an exemplary embodiment, each logical unit corresponds to one logical address. For example, one logical address may include one or a plurality of logical block addresses (LBA) or other logical management units. In an example embodiment, one logical unit may also correspond to a logical programming unit or be composed of a plurality of continuous or discontinuous logical addresses.

It should be noted that one logical unit may be mapped to one or a plurality of physical units. If a certain physical unit is currently mapped to a certain logical unit, it means that the data currently stored in this physical unit includes valid data. On the contrary, if a certain physical unit is not currently mapped to any logical unit, it means that the data currently stored in this physical unit is invalid data.

The memory management circuit 51 may record management data describing a mapping relationship between the logical units and the physical units (which is also referred to as logical-to-physical mapping information) in at least one logical-to-physical mapping table. When the host system 11 wants to read data from the memory storage device 10 or write data to the memory storage device 10, the memory management circuit 51 may access the rewritable non-volatile memory module 43 according to the information in the logical-to-physical mapping table.

In an example embodiment, the memory storage device 10 may be in a busy state to process instructions from the host system 11. For example, according to instructions from the host system 11, the memory management circuit 51 may instruct the rewritable non-volatile memory module 43 to perform reading, writing or erasing operations. While the rewritable non-volatile memory module 43 is performing reading, writing or erasing operations, the memory storage device 10 may be in a busy state. After completing the instructions from the host system 11, the memory storage device 10 may be in an idle state while the rewritable non-volatile memory module 43 does not perform reading, writing or erasing operations.

In an exemplary embodiment, the memory storage device 10 may operate in a power saving mode and a normal mode to achieve a balance between performance and power consumption of the memory storage device 10. For example, the power consumption (for example, power consumption per unit time) of the memory storage device 10 in the power saving mode may be lower than the power consumption of the memory storage device 10 in the normal mode. In addition, the performance of the memory storage device 10 in the normal mode may be higher than the performance of the memory storage device 10 in the power saving mode.

In an exemplary embodiment, in the power saving mode, power supply to at least a part of circuit modules in the memory storage device 10 may be cut off. For example, in the power saving mode, the power supply to the rewritable non-volatile memory module 43 may be cut off to reduce the power consumption of the memory storage device 10.

In an exemplary embodiment, in the power saving mode, power supply to at least one buffer memory (for example, the buffer memory 55) in the memory storage device 10 may be maintained (i.e., not cut off). Therefore, in the power saving mode, the memory storage device 10 is still able to save the data stored in the buffer memory.

In an exemplary embodiment, in the power saving mode, the power supply to the rewritable non-volatile memory module 43 and the buffer memory (for example, the buffer memory 55) may all be cut off to reduce power consumption of the memory storage device 10. It should be noted that once the power supply to the buffer memory (for example, the buffer memory 55) is cut off, the data stored in the buffer memory may be lost.

In an exemplary embodiment, compared to the normal mode, in the power saving mode, a unit time read data amount, a unit time written data amount, a unit time interface transmission data amount, and/or a system clock of the memory storage device 10 may also be reduced to reduce the power consumption of the memory storage device 10. However, since the unit time read data amount, the unit time written data amount, the unit time interface transmission data amount and/or the system clock of the memory storage device 10 are reduced, in the power saving mode, the performance of the memory storage device 10 is also decreased accordingly. In addition, more types of parameters or system configurations may be adjusted according to whether the memory storage device 10 is currently operating in the normal mode or the power saving mode, which is not limited by the invention.

In an exemplary embodiment, the memory storage device 10 may switch between the normal mode and the power saving mode based on a plurality of operation modes. For example, the plurality of operation modes include a first operation mode and a second operation mode. In particular, a waiting time before the memory storage device 10 enters the power saving mode in the first operation mode (which is also referred to as a first waiting time) may be longer than a waiting time before the memory storage device 10 enters the power saving mode in the second operation mode (which is also referred to as a second waiting time). For example, it is assumed that the first waiting time is N milliseconds (ms), and the second waiting time is M milliseconds, N may be greater than M.

In an exemplary embodiment, it is assumed that the memory storage device 10 operates in the first operation mode. In the first operation mode, the memory management circuit 51 may count a time length of the memory storage device 10 being in an idle state (which is also referred to as a first time length). The memory management circuit 51 may determine whether the first time length exceeds the first waiting time (for example, N milliseconds). In response to the first time length of exceeding the first waiting time, the memory management circuit 51 may control the memory storage device 10 to enter the power saving mode. However, if the first time length does not exceed the first waiting time, the memory management circuit 51 may not control the memory storage device 10 to enter the power saving mode. For example, if the first time length does not exceed the first waiting time, the memory storage device 10 may maintain in the normal mode.

In an exemplary embodiment, it is assumed that the memory storage device 10 operates in the second operation mode. In the second operation mode, the memory management circuit 51 may count a time length of the memory storage device 10 being in the idle state (which is also referred to as a second time length). The memory management circuit 51 may determine whether the second time length exceeds the second waiting time (for example, M milliseconds, and M is less than N). In response to the second time length exceeding the second waiting time, the memory management circuit 51 may control the memory storage device 10 to enter the power saving mode. However, if the second time length does not exceed the second waiting time, the memory management circuit 51 may not control the memory storage device 10 to enter the power saving mode. For example, if the second time length does not exceed the second waiting time, the memory storage device 10 may maintain in the normal mode.

In other words, compared with the second operation mode, in the first operation mode, the memory storage device 10 needs to maintain in the idle state for a longer period of time before entering the idle mode. However, in the second operation mode, the memory storage device 10 may quickly enter the power saving mode as long as it may maintain in the idle state for a short period of time (even without any waiting time).

In an exemplary embodiment, the second waiting time may also be zero. When the second waiting time is zero (i.e., M=0), in the second operation mode, in response to the memory storage device 10 being in or entering the idle state (for example, switching from a normal working state to the idle state), the memory management circuit 51 may directly control the memory storage device 10 to enter the power saving mode without any waiting time.

In an exemplary embodiment, the memory management circuit 51 may dynamically decide to operate the memory storage device 10 in the first operation mode or the second operation mode according to a current need. In this way, the power consumption of the memory storage device 10 may be effectively reduced without affecting the performance of the memory storage device 10 as much as possible. From another perspective, by dynamically adjusting (such as increasing or decreasing) the waiting time for the memory storage device 10 to enter the power saving mode, the power consumption of the memory storage device 10 may be effectively reduced without affecting the user experience as much as possible.

In an exemplary embodiment, the memory management circuit 51 may detect a state (which is also referred to as a performance state) of the memory storage device 10. The performance state is related to a performance of the memory storage device 10 within a time range (which is also referred to as a target time range). For example, the target time range may be 250 milliseconds, and the target time range may be adjusted according to practical needs.

In an example embodiment, the memory management circuit 51 may dynamically adjust the operation mode of the memory storage device 10 according to the performance state. For example, based on the detected performance state, the memory management circuit 51 may switch the operation mode of the memory storage device 10 from the first operation mode to the second operation mode, or from the second operation mode to the first operation mode. Alternatively, based on the detected performance state, the memory management circuit 51 may also temporarily not change the operation mode of the memory storage device 10.

In an exemplary embodiment, the memory management circuit 51 may update a reference value based on the performance state of the memory storage device 10. The reference value is related to the performance of the memory storage device 10 within the target time range. For example, the reference value may reflect the performance and/or a performance change trend of the memory storage device 10 within the target time range. The memory management circuit 51 may adjust the operation mode of the memory storage device 10 according to the reference value.

In an exemplary embodiment, the memory management circuit 51 may update the reference value based on at least one of a written data amount, a read data amount, and an interface transmission data amount of the memory storage device 10 within the target time range. For example, the written data amount may include the unit time written data amount of the memory storage device 10 within the target time range. The read data amount may include the unit time read data amount of the memory storage device 10 within the target time range. The interface transmission data amount may include the unit time interface transmission data amount of the memory storage device 10 within the target time range. In this way, the updated reference value may also reflect the performance and/or performance change trend of the memory storage device 10 within the target time range, such as a changing trend of the unit time written data amount, the unit time read data amount and/or the unit time interface transmission data amount of the memory storage device 10 within the target time range.

In an exemplary embodiment, the written data amount of the memory storage device 10 within the target time range may include the unit time written data amount of the memory storage device 10 detected at one or more time points within the target time range. For example, the written data amount may be directly related to a total number of write instructions that the memory storage device 10 obtains from the host system 11 within the target time range.

In an example embodiment, the read data amount of the memory storage device 10 within the target time range may include the unit time read data amount of the memory storage device 10 detected at one or more time points within the target time range. For example, the read data amount may be directly related to a total number of read instructions that the memory storage device 10 obtains from the host system 11 within the target time range.

In an example embodiment, the interface transmission data amount of the memory storage device 10 within the target time range may include the unit time interface transmission data amount of detected between the memory storage device 10 and the host system 11 at one or more time points within the target time range. For example, the interface transmission data amount may be directly related to a total number of instructions obtained by the memory storage device 10 from the host system 11 within the target time range and/or a total amount of data transferred between the memory storage device 10 and the host system 11 within the target time range.

In an exemplary embodiment, the memory management circuit 51 may obtain at least one performance evaluation parameter according to at least one of the written data amount, the read data amount, and the interface transmission data amount of the memory storage device 10 within the target time range. For example, one performance evaluation parameter may reflect or may be directly related to the written data amount, the read data amount, and/or the interface transmission data amount of the memory storage device 10 at a certain time point (which is also referred to as a sampling point) within the target time range. Alternatively, in overall, the plurality of performance evaluation parameters may reflect a changing trend of the written data amount, the read data amount, and/or the interface transmission data amount of the memory storage device 10 within the target time range.

In an example embodiment, the memory management circuit 51 may determine whether one of the performance evaluation parameters (which is also referred to as a first performance evaluation parameter) meets an update condition (which is also referred to as a first update condition). In response to the first performance evaluation parameter meeting the first update condition, the memory management circuit 51 may add an adjustment value (which is also referred to as a first adjustment value) to the reference value to update the reference value. For example, the first adjustment value may be any value greater than zero.

In an example embodiment, the memory management circuit 51 may determine whether the first performance evaluation parameter meets another update condition (which is also referred to as a second update condition). In response to the first performance evaluation parameter meeting the second update condition, the memory management circuit 51 may subtract an adjustment value (which is also referred to as a second adjustment value) from the reference value to update the reference value. For example, the second adjustment value may be any value greater than zero, and the first adjustment value may be the same as or different from the second adjustment value.

In an exemplary embodiment, the memory management circuit 51 may determine whether the first performance evaluation parameter is less than a preset value (which is also referred to as a first preset value). In response to the first performance evaluation parameter being less than the first preset value, the memory management circuit 51 may determine that the first performance evaluation parameter meets the first update condition and update the reference value (for example, add the first adjustment value to the reference value). However, if the first performance evaluation parameter is not less than the first preset value, the memory management circuit 51 may determine that the first performance evaluation parameter does not meet the first update condition and does not update the reference value.

In an example embodiment, the memory management circuit 51 may determine whether the first performance evaluation parameter is greater than a preset value (which is also referred to as a second preset value). In response to the first performance evaluation parameter being greater than the second preset value, the memory management circuit 51 may determine that the second performance evaluation parameter meets the second update condition and update the reference value (for example, subtract the second adjustment value from the reference value). However, if the first performance evaluation parameter is not greater than the second preset value, the memory management circuit 51 may determine that the first performance evaluation parameter does not meet the second update condition and does not update the reference value.

In an example embodiment, it is assumed that the first preset value is P1, the second preset value is P2, the first adjustment value is S1, the second adjustment value is S2, and P1 is smaller than P2. In an exemplary embodiment, in response to the first performance evaluation parameter being less than P1, the memory management circuit 51 may determine that the first performance evaluation parameter meets the first update condition and add S1 to the reference value to obtain an updated reference value. Alternatively, in an exemplary embodiment, in response to the first performance evaluation parameter being greater than P2, the memory management circuit 51 may determine that the first performance evaluation parameter meets the second update condition and subtract S2 from the reference value to obtain the updated reference value.

In an exemplary embodiment, more update conditions may be used to update the reference value, and the adjustment value corresponding to each update condition may be set according to practical needs. Thereafter, in response to a certain performance evaluation parameter meeting the update condition, the memory management circuit 51 may update the reference value based on the adjustment value corresponding to the update condition.

In an example embodiment, the memory management circuit 51 may determine whether the reference value (for example, the updated reference value) meets a trigger condition (which is also referred to as a first trigger condition). In an exemplary embodiment, in response to the reference value meeting the first trigger condition, the memory management circuit 51 may set the operation mode of the memory storage device 10 to the first operation mode. However, if the reference value does not meet the first trigger condition, the memory management circuit 51 may not change the operation mode of the memory storage device 10 (for example, maintain the operation mode of the memory storage device 10 in the second operation mode).

In an example embodiment, the memory management circuit 51 may determine whether the reference value (for example, the updated reference value) meets another trigger condition (which is also referred to as a second trigger condition). In an exemplary embodiment, in response to the reference value meeting the second trigger condition, the memory management circuit 51 may set the operation mode of the memory storage device 10 to the second operation mode. However, if the reference value does not meet the second trigger condition, the memory management circuit 51 may not change the operation mode of the memory storage device 10 (for example, maintain the operation mode of the memory storage device 10 in the first operation mode).

In an exemplary embodiment, the memory management circuit 51 may determine whether the reference value is less than a threshold value (which is also referred to as a first threshold value). In an example embodiment, if the reference value is less than the first threshold value, it means that a performance change trend of the memory storage device 10 within the target time range is: the performance of the memory storage device 10 within the target time range does not significantly decrease (perhaps even gradually increase). Therefore, in response to the reference value being less than the first threshold value, the memory management circuit 51 may determine that the reference value meets the first trigger condition and set the operation mode of the memory storage device 10 to the first operation mode. However, if the reference value is not less than the first threshold value, the memory management circuit 51 may determine that the reference value does not meet the first trigger condition and does not adjust the operation mode of the memory storage device 10.

In an exemplary embodiment, when the performance of the memory storage device 10 does not significantly decrease (may even gradually increase) within the target time range, the operation mode of the memory storage device 10 is set to the first operation mode, which may delay a time when the memory storage device 10 enters the power saving mode and/or reduce a frequency of the memory storage device 10 entering the power saving mode. In this way, it may be avoided that the memory storage device 10 increases unnecessary power consumption due to that the memory storage device 10 frequently enters and exits the power saving mode under the situation that the performance of the memory storage device 10 does not significantly decrease (or may even gradually increase).

In an exemplary embodiment, the memory management circuit 51 may determine whether the reference value is greater than a threshold value (which is also referred to as a second threshold value). In an example embodiment, if the reference value is greater than the second critical value, it means that the performance change trend of the memory storage device 10 within the target time range is: the performance of the memory storage device 10 within the target time range has been significantly decreased. Therefore, in response to the reference value being greater than the second threshold value, the memory management circuit 51 may determine that the reference value meets the second trigger condition and set the operation mode of the memory storage device 10 to the second operation mode. However, if the reference value is not greater than the second threshold value, the memory management circuit 51 may determine that the reference value does not meet the second trigger condition and does not adjust the operation mode of the memory storage device 10.

In an exemplary embodiment, when the performance of the memory storage device 10 has significantly decreased within the target time range, the operation mode of the memory storage device 10 is set to the second operation mode. The time point at which the memory storage device 10 enters the power saving mode may be advanced and/or the frequency at which the memory storage device 10 enters the power saving mode may be increased. In this way, when the performance of the memory storage device 10 has significantly decreased, the power consumption of the memory storage device 10 may be effectively reduced.

Figure 7:
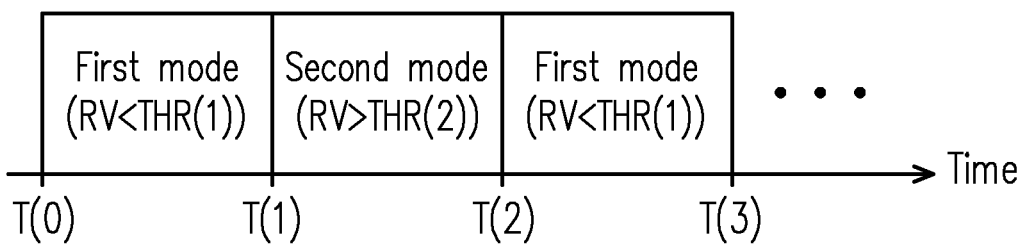
FIG. 7 is a schematic diagram illustrating controlling a memory storage device to operate in a first operation mode or a second operation mode at different time points according to an exemplary embodiment of the invention.

FIG. 7 is a schematic diagram illustrating controlling the memory storage device to operate in the first operation mode or the second operation mode at different time points according to an exemplary embodiment of the invention. Referring to FIG. 7, it is assumed that the first threshold value is THR(1), the second threshold value is THR(2), and THR(1) is smaller than THR(2). In an example embodiment, between time points T(0)-T(1) and between time points T(2)-T(3), in response to the reference value RV being less than THR(1), the memory management circuit 51 may determine that the reference value RV meets the first trigger condition and set the operation mode of the memory storage device 10 to a first mode (i.e., the first operation mode). In this way, between the time points T(0)-T(1) and between the time points T(2)-T(3), the memory storage device 10 may switch between the normal mode and power saving mode based on the first operation mode, as shown in FIG. 8.

Figure 8:
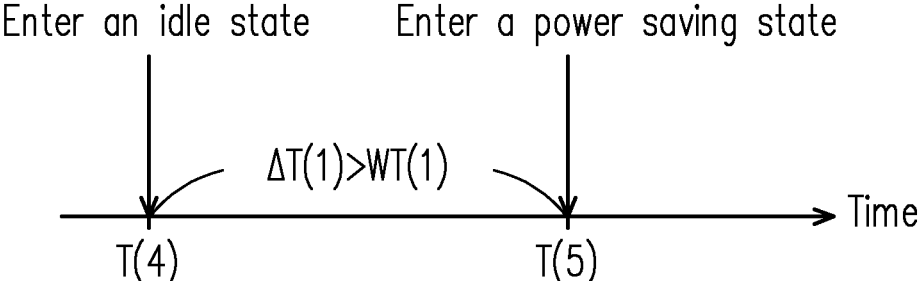
FIG. 8 is a schematic diagram of controlling the memory storage device to enter a power saving mode in the first operation mode according to an exemplary embodiment of the invention.

FIG. 8 is a schematic diagram of controlling the memory storage device to enter the power saving mode in the first operation mode according to an exemplary embodiment of the invention. Referring to FIG. 8, in the first operation mode, it is assumed that the memory storage device 10 is in or enters the idle state starting from a time point T(4). Before a time length ΔT(1) (i.e., the first time length) of the memory storage device 10 being in the idle state exceeds a waiting time WT(1) (i.e., the first waiting time), the memory management circuit 51 may maintain the memory storage device 10 in the normal mode. It should be noted that after a time point T(5), in response to the time length of time ΔT(1) exceeds the waiting time WT(1) (i.e., ΔT(1)>WT(1)), the memory management circuit 51 may control the memory storage device 10 to enter the power saving mode.

Referring back to FIG. 7, between the time points T(1)-T(2), in response to the reference value RV being greater than THR(2), the memory management circuit 51 may determine that the reference value RV meets the second trigger condition, and set the operation mode of the memory storage device 10 to a second mode (i.e., the second operation mode). In this way, between the time points T(1) and T(2), the memory storage device 10 may switch between the normal mode and the power saving mode based on the second operation mode, as shown in FIG. 9.

Figure 9:
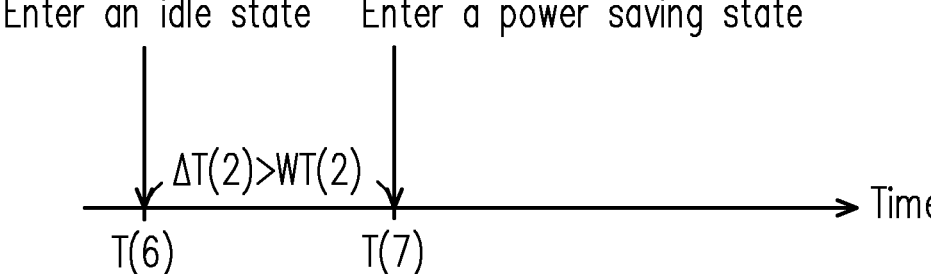
FIG. 9 is a schematic diagram of controlling the memory storage device to enter the power saving mode in the second operation mode according to an exemplary embodiment of the invention.

FIG. 9 is a schematic diagram of controlling the memory storage device to enter the power saving mode in the second operation mode according to an exemplary embodiment of the invention. Referring to FIG. 9, in the second operation mode, it is assumed that the memory storage device 10 is in or enters the idle state starting from a time point T(6). Before a time length ΔT(2) (i.e., the second time length) of the memory storage device 10 being in the idle state exceeds a waiting time WT(2) (i.e., the second waiting time), the memory management circuit 51 maintains the memory storage device 10 in the normal mode. It should be noted that after a time point T(7), in response to the time length of time ΔT(2) exceeds the waiting time WT(2) (i.e., ΔT(2)>WT(2)), the memory management circuit 51 may control the memory storage device 10 to enter the power saving mode. It should be noted that the waiting time WT(2) in FIG. 9 may be less than the waiting time WT(1) in FIG. 8 (i.e., WT(2)<WT(1)).

In an example embodiment, the waiting time WT(2) may also be zero. When the waiting time WT(2) is zero (i.e., WT(2)=0), at the time point T(6), in response to the memory storage device 10 entering the idle state, the memory management circuit 51 may directly control the memory storage device 10 to enter the power saving mode without any waiting time.

In an example embodiment, the power saving mode entered in the first operation mode is the same as the power saving mode entered in the second operation mode. Namely, no matter how many power saving modes the memory storage device 10 supports (such as power saving modes under different power states or default hibernation, sleep or standby modes, etc.), the power saving mode entered in the first operation mode and the power saving mode entered in the second operation mode refer to a same power saving mode among the one or plurality of power saving modes, not different (types) of power saving modes.

In an exemplary embodiment, a difference between entering the power saving mode in the first operation mode and entering the power saving mode in the second operation mode only lies in the waiting time before entering the power saving mode. After the corresponding waiting time, the power saving modes entered are not different from each other. Alternatively, in an example embodiment, the power saving mode entered in the first operation mode may also be different from the power saving mode entered in the second operation mode, depending on practical requirements.

FIG. 10 is a flowchart of a memory control method according to an exemplary embodiment of the invention. Referring to FIG. 10, in step S1001, a state of the memory storage device is detected. In step S1002, an operation mode of the memory storage device is adjusted according to the state of the memory storage device, where the operation mode includes a first operation mode and a second operation mode. In particular, the first waiting time before the memory storage device enters the power saving mode in the first operation mode is longer than the second waiting time before the memory storage device enters the power saving mode in the second operation mode.

FIG. 11 is a flowchart of a memory control method according to an exemplary embodiment of the invention. Referring to FIG. 11, in step S1101, a state of a memory storage device is detected. In step S1102, a reference value is updated based on the state of the memory storage device. In step S1103, it is determined whether the reference value meets a first trigger condition. If the reference value meets the first trigger condition, in step S1104, the operation mode of the memory storage device is set to the first operation mode. If the reference value does not meet the first trigger condition, in step S1105, it is determined whether the reference value meets a second trigger condition. If the reference value meets the second trigger condition, in step S1106, the operation mode of the memory storage device is set to the second operation mode. If the reference value does not meet the first trigger condition and the second trigger condition, step S1101 may be returned and the current operation mode is maintained. In addition, after steps S1104 and S1106, the step flow may also return to step S1101.

Figure 12:
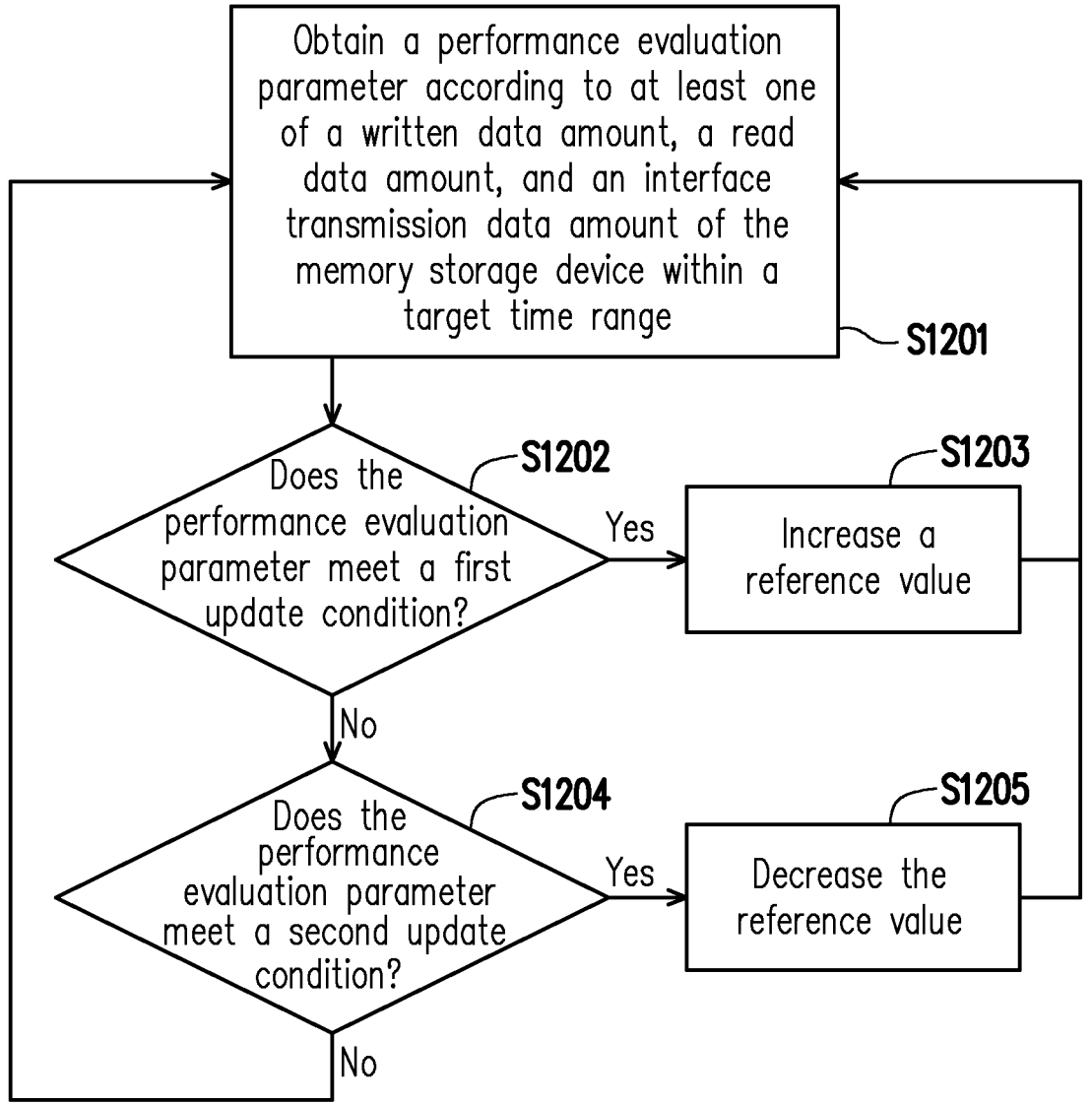
FIG. 12 is a flowchart of a memory control method according to an exemplary embodiment of the invention.

FIG. 12 is a flowchart of a memory control method according to an exemplary embodiment of the invention. Referring to FIG. 12, in step S1201, a performance evaluation parameter is obtained according to at least one of the written data amount, the read data amount, and the interface transmission data amount of the memory storage device within a target time range. In step S1202, it is determined whether the performance evaluation parameter meets a first update condition. If the performance evaluation parameter meets the first update condition, in step S1203, the reference value is increased (for example, the reference value is added to the first adjustment value). If the performance evaluation parameter does not meet the first update condition, in step S1204, it is determined whether the performance evaluation parameter meets a second update condition. If the performance evaluation parameter meets the second update condition, in step S1205, the reference value is reduced (for example, to subtract the second adjustment value from the reference value). If the performance evaluation parameter does not meet the first update condition and the second update condition, the step flow may return to step S1201. In addition, after steps S1203 and S1205, the step flow may also return to step S1201.

However, each step in FIG. 10 to FIG. 12 has been described in detail above, which will not be repeated here. It should be noted that each step in FIG. 10 to FIG. 12 may be implemented as a plurality of program codes or circuits, which is not limited by the invention. In addition, the methods of FIG. 10 to FIG. 12 may be used in collaboration with the above exemplary embodiments or may be used alone, which are not limited by the invention.

In summary, the memory control method, memory storage device and memory control circuit unit provided by the invention may dynamically adjust the operation mode of the memory storage device according to the performance state of the memory storage device, thereby changing the waiting time of the memory storage device before entering the power saving mode. In this way, the power consumption of the memory storage device may be further reduced without affecting the performance of the memory storage device as much as possible, so as to enhance user experience.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A memory control method, adapted to a memory storage device, wherein the memory control method comprises:
detecting a state of the memory storage device;
updating a reference value based on the state of the memory storage device, wherein the reference value is related to a performance of the memory storage device within a target time range; and
adjusting an operation mode of the memory storage device according to the reference value, comprising:
in response to the reference value meeting a first trigger condition, setting the operation mode of the memory storage device to the first operation mode; and in response to the reference value meeting a second trigger condition, setting the operation mode of the memory storage device to the second operation mode,
wherein the first trigger condition is different from the second trigger condition,
wherein the operation mode comprises a first operation mode and a second operation mode,
a first waiting time before the memory storage device entering a power saving mode in the first operation mode is longer than a second waiting time before the memory storage device entering the power saving mode in the second operation mode.

2. The memory control method as claimed in claim 1, wherein the second waiting time is zero.

3. The memory control method as claimed in claim 1, wherein updating the reference value based on the state of the memory storage device comprises:
updating the reference value according to at least one of a written data amount, a read data amount, and an interface transmission data amount of the memory storage device within the target time range.

4. The memory control method as claimed in claim 3, wherein updating the reference value according to the at least one of the written data amount, the read data amount, and the interface transmission data amount of the memory storage device within the target time range comprises:
obtaining at least one performance evaluation parameter according to the at least one of the written data amount, the read data amount, and the interface transmission data amount of the memory storage device within the target time range;
in response to a first performance evaluation parameter in the at least one performance evaluation parameter meeting a first update condition, adding a first adjustment value to the reference value; and
in response to the first performance evaluation parameter meeting a second update condition, subtracting a second adjustment value from the reference value,
wherein the first update condition is different from the second update condition.

5. The memory control method as claimed in claim 1, wherein in the power saving mode, the memory storage device is capable of saving data stored in a buffer memory.

6. The memory control method as claimed in claim 1, wherein the power saving mode entered in the first operation mode is the same as the power saving mode entered in the second operation mode.

7. A memory storage device, comprising:
a connection interface unit, configured to couple to a host system;
a rewritable non-volatile memory module; and
a memory control circuit unit, coupled to the connection interface unit and the rewritable non-volatile memory module,
wherein the memory control circuit unit is configured to:
detect a state of the memory storage device;
update a reference value based on the state of the memory storage device, wherein the reference value is related to a performance of the memory storage device within a target time range; and
adjust an operation mode of the memory storage device according to the reference value, wherein an operation of the memory control circuit unit adjusting the operation mode of the memory storage device according to the reference value comprises:

in response to the reference value meeting a first trigger condition, setting the operation mode of the memory storage device to the first operation mode; and in response to the reference value meeting a second trigger condition, setting the operation mode of the memory storage device to the second operation mode, wherein the first trigger condition is different from the second trigger condition, wherein the operation mode comprises a first operation mode and a second operation mode, a first waiting time before the memory storage device entering a power saving mode in the first operation mode is longer than a second waiting time before the memory storage device entering the power saving mode in the second operation mode.

8. The memory storage device as claimed in claim 7, wherein the second waiting time is zero.

9. The memory storage device as claimed in claim 7, wherein an operation of the memory control circuit unit updating the reference value based on the state of the memory storage device comprises:

updating the reference value according to at least one of a written data amount, a read data amount, and an interface transmission data amount of the memory storage device within the target time range.

10. The memory storage device as claimed in claim 9, wherein an operation of the memory control circuit unit updating the reference value according to the at least one of the written data amount, the read data amount, and the interface transmission data amount of the memory storage device within the target time range comprises:

obtaining at least one performance evaluation parameter according to the at least one of the written data amount, the read data amount, and the interface transmission data amount of the memory storage device within the target time range;

in response to a first performance evaluation parameter in the at least one performance evaluation parameter meeting a first update condition, adding a first adjustment value to the reference value; and in response to the first performance evaluation parameter meeting a second update condition, subtracting a second adjustment value from the reference value, wherein the first update condition is different from the second update condition.

11. The memory storage device as claimed in claim 7, wherein in the power saving mode, the memory storage device is capable of saving data stored in a buffer memory.

12. The memory storage device as claimed in claim 7, wherein the power saving mode entered in the first operation mode is the same as the power saving mode entered in the second operation mode.

13. A memory control circuit unit, configured to control a rewritable non-volatile memory module, wherein the memory control circuit unit comprises:

a host interface, configured to couple to a host system;

a memory interface, configured to couple to the rewritable non-volatile memory module; and a memory management circuit, coupled to the host interface and the memory interface, wherein the memory management circuit is configured to:

detect a state of the memory storage device;

update a reference value based on the state of the memory storage device, wherein the reference value is related to a performance of the memory storage device within a target time range; and adjust an operation mode of the memory storage device according to the reference value, wherein an operation of the memory management circuit adjusting the operation mode of the memory storage device according to the reference value comprises:

in response to the reference value meeting a first trigger condition, setting the operation mode of the memory storage device to the first operation mode; and in response to the reference value meeting a second trigger condition, setting the operation mode of the memory storage device to the second operation mode, wherein the first trigger condition is different from the second trigger condition, wherein the operation mode comprises a first operation mode and a second operation mode, a first waiting time before the memory storage device entering a power saving mode in the first operation mode is longer than a second waiting time before the memory storage device entering the power saving mode in the second operation mode.

14. The memory control circuit unit as claimed in claim 13, wherein the second waiting time is zero.

15. The memory control circuit unit as claimed in claim 13, wherein an operation of the memory management circuit updating the reference value based on the state of the memory storage device comprises:

updating the reference value according to at least one of a written data amount, a read data amount, and an interface transmission data amount of the memory storage device within the target time range.

16. The memory control circuit unit as claimed in claim 15, wherein an operation of the memory management circuit updating the reference value according to the at least one of the written data amount, the read data amount, and the interface transmission data amount of the memory storage device within the target time range comprises:

obtaining at least one performance evaluation parameter according to the at least one of the written data amount, the read data amount, and the interface transmission data amount of the memory storage device within the target time range;

in response to a first performance evaluation parameter in the at least one performance evaluation parameter meeting a first update condition, adding a first adjustment value to the reference value; and in response to the first performance evaluation parameter meeting a second update condition, subtracting a second adjustment value from the reference value, wherein the first update condition is different from the second update condition.

17. The memory control circuit unit as claimed in claim 13, wherein in the power saving mode, the memory storage device is capable of saving data stored in a buffer memory.

18. The memory control circuit unit as claimed in claim 13, wherein the power saving mode entered in the first operation mode is the same as the power saving mode entered in the second operation mode.

* * * * *